United States Patent [19]
Philippe et al.

[11] Patent Number: 5,442,154
[45] Date of Patent: Aug. 15, 1995

[54] LASER BEAM MACHINE SAFETY DEVICE AND METHOD OF USE

[75] Inventors: Michel Philippe, Cestas; Benoit Soulignac, Leognan, both of France

[73] Assignee: Lectra Systems, Cestas, France

[21] Appl. No.: 162,098

[22] PCT Filed: Apr. 30, 1992

[86] PCT No.: PCT/FR93/00423

§ 371 Date: Dec. 10, 1993

§ 102(e) Date: Dec. 10, 1993

[87] PCT Pub. No.: WO93/22095

PCT Pub. Date: Nov. 11, 1993

[30] Foreign Application Priority Data

Apr. 30, 1992 [FR] France ............... 92 05414

[51] Int. Cl.6 .............................................. B23K 26/00
[52] U.S. Cl. .................. 219/121.62; 219/121.83; 361/115; 250/354.1
[58] Field of Search ............. 219/121.78, 121.79, 219/121.83, 121.62, 121.85; 250/354.1; 361/103, 115

[56] References Cited

U.S. PATENT DOCUMENTS

| | | |
|---|---|---|
| 4,197,454 | 4/1980 | Knutsen . |
| 4,311,142 | 1/1982 | Machida ............... 219/121.62 |
| 4,512,002 | 4/1985 | Kosaka . |
| 4,556,875 | 12/1985 | Ishiwatari ............. 219/121.62 |
| 4,730,113 | 3/1988 | Edwards et al. ........ 219/121.62 |
| 4,868,361 | 9/1989 | Chande et al. ......... 219/121.62 |

FOREIGN PATENT DOCUMENTS

| | | | |
|---|---|---|---|
| 57-156887 | 9/1982 | Japan ................. | 219/121.83 |
| 2062901 | 5/1981 | United Kingdom . | |

OTHER PUBLICATIONS

Japanese Patent Abstracts, vol. 11, No. 138 (E-503) 2 May 1987, For JPA61278143 (Seiko Epson Corp.) 9 Dec. 1986.

Japanese Patent Abstracts, vol. 8, No. 82 (P-268) (1519) 14 Apr. 1984 For JPA58225328 (Fujitsu K.K.) 27 Dec. 1983.

Primary Examiner—Bruce A. Reynolds
Assistant Examiner—Gregory L. Mills
Attorney, Agent, or Firm—Beveridge, DeGrandi, Weilacher & Young

[57] ABSTRACT

A safety device for use with a laser beam (5) passing from a source (1) along a given optical path which optionally includes mirrors (M1-M5), in conjunction with a beam control signal processing network. The processing network includes at least one removable signal blocking element (10, 10') located on the optical path and at least partially consisting of a signal conductor (16, 18, 19) surrounding said beam (5) for co-operating therewith in order to cut off the signal instantaneously and block the beam should any deflection occur.

8 Claims, 4 Drawing Sheets

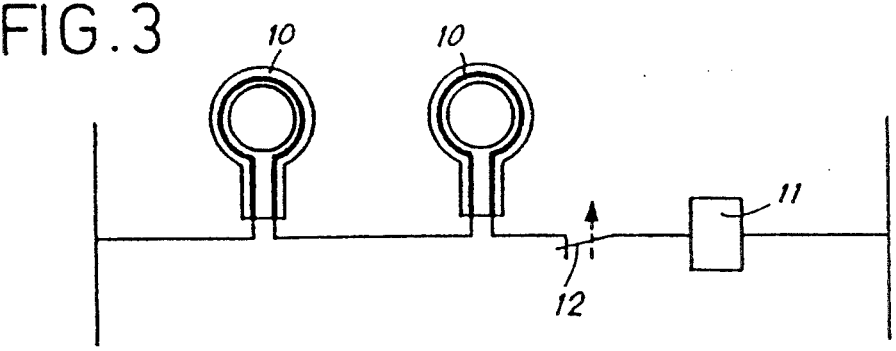
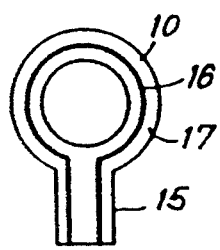 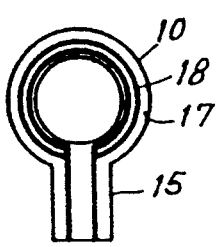 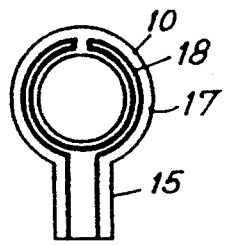 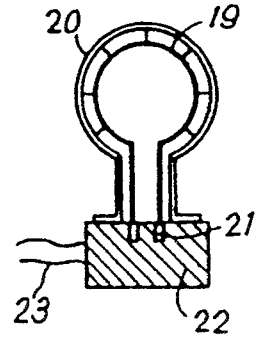
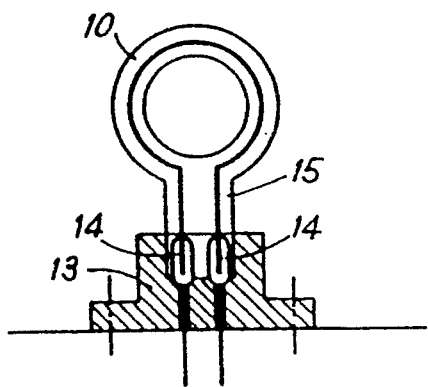 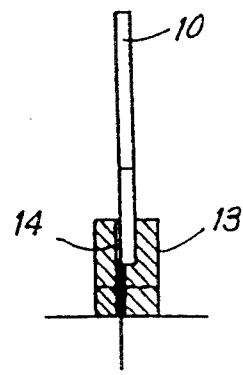

LASER BEAM MACHINE SAFETY DEVICE AND METHOD OF USE

FIELD OF THE INVENTION

The present invention relates to a safety device specifically adapted to automatic machines of the kind that use a laser beam having an infrared wavelength and being of low to very high power, such as a tool for cutting, for welding, for drilling, for heat treatment, for removing material, etc.

1. Background of the Invention

The present invention also relates to a method of implementing the above device to detect deviations of a laser beam.

2. Objects and Summary of the Invention

In general, multi-axis automatic machines that already exist on the market comprise a laser beam generator or laser "source" and an optical path constituted by mirrors that reflect the laser beam so as to bring it to the working portion of the tool such as a head for cutting or for welding. The head may be stationary or it may be moving, either at the end of a robot arm, or using the same principles as an XY plotter, or else it may be on a moving gantry having more than two axes.

One of the main problems with machines of that type lies in the need to ensure safety for personnel and for the machine. Given the technology used (beam being conveyed by mirrors) it may happen that the laser beam is deflected from its initial path and then becomes a danger to the safety of human beings and of equipment.

One of the techniques used in the context of providing safety for laser machines consists in protecting access to the optical path of the laser by caps, bellows, and passive diaphragms (metal tubes through which the laser beam passes). This technique has the drawback of not making it possible to detect deflection of the beam path, should that occur, since the passive diaphragms serve merely to absorb all or a fraction of the beam energy as a function of the power of the laser. That method therefore continues to leave some risk for equipment and for personnel.

Other techniques exist that seek to obtain continuous control of the alignment of the laser beam. To do that, temperature sensors (thermocouples, hot wires, ...) are disposed around the periphery of a section through which the beam passes. Any unbalance in the heating of one of the sensors compared to the others provides information (direction, magnitude, ...) about the deviation of the laser beam from its normal trajectory. The information is processed electronically by a computer for the purpose of automatically correcting the deviation of the mirrors so as to realign the beam on its ideal trajectory. That method is very expensive and it is used only on systems that require continuous monitoring of laser beam alignment, and it suffers from the additional drawback of using a computer to manage safety. In order to be genuinely effective and reliable, safety means must act directly on the laser beam control circuit without any need for computer processing. In addition, if the power of the laser is too high, then the temperature sensors may be damaged and become useless.

An object of the invention is to solve the above technical problems in satisfactory manner.

According to the invention, this object is achieved by means of a safety device for using a laser beam from a source following a determined optical path that optionally includes mirrors each associated with an operating network for a beam monitoring signal, the device being characterized in that said operating network comprises at least one removable signal interrupter element disposed on the optical path and constituted at least in part by a conductor for said signal that surrounds said beam and that is suitable for interacting with the beam in the event of the beam deviating, thereby instantaneously causing the monitoring signal to be interrupted and thus causing the beam to be interrupted.

In a first embodiment, said interrupter element is entirely conductive.

In another embodiment, said signal conductor is characterized by a frame whose central axis coincides with the normal direction of the beam and which is secured to a support member provided with means for connecting said conductor to the operating network.

According to a characteristic, said interrupter element is annular and said conductor forms a loop around the beam.

According to another characteristic, said signal conductor is suitable for being destroyed by the energy of the beam.

In a first variant embodiment, said conductor is constituted by at least one printed circuit that is coupled to the electrical circuit of the operating network.

In another variant, said conductor is constituted by at least one optical fiber connected to a transmitter/receiver coupled to the operating network.

In yet another variant, said conductor is constituted by a pneumatic duct connected to an electro-pneumatic converter coupled to the operating network.

The invention also provides a method of detecting deviations of a laser beam emitted by a source and following a given optical path that includes mirrors, the source being associated with an operating network for a beam monitoring signal, the method being characterized in that removable interrupter elements of the signal are inserted in the operating network along the optical path and around the beam, preferably at the inlets and at the outlets of the mirrors, each interrupter element being constituted, at least in part, by a conductor of said signal and suitable for interacting with the beam so as to cause the monitoring signal to be interrupted instantly and thus cause the beam to be interrupted.

The device and the method of the invention make it possible to achieve a high degree of safety in a manner that is simple and cheap.

The device of the invention complies with the standards in force and it is adapted to machines that use a laser beam of infrared wavelength at a power that may lie in a range a few watts to several kilowatts.

The invention may be implemented by placing a plurality of removable interrupter elements along the optical path travelled by the laser beam, e.g. at the inlet and at the outlet of each mirror.

The element placed at the inlet may respond to small deviations of the beam whereas that placed at the outlet takes account of large deviations. Access to the optical path may be further protected by conventional means such as caps, bellows, and passive diaphragms.

The laser beam passes through the interrupter elements but does not come into contact therewith. One of the possible implementations therefore consists in giving said elements an annular shape having a diameter that is slightly greater than that of the beam so as to make a small amount of path shifting or adjustment possible.

The elements then constitute respective destructible conductive loops (e.g. meltable loops) for a signal (electrical signal, pneumatic signal, light signal, . . . ), and they are then connected in series in the operating network for the monitoring signal that provides safety for the machine.

On deviating, the beam encounters an interrupter element that includes a destructible conductor. Since the laser has a wavelength in the infrared and since the conductive material is absorbent, the quantity of energy received by one of the conductors in the event of the beam being deviated causes the conductor to melt so that it behaves like a fuse that interrupts a monitoring signal. The circuit through which the signal passes (electrical signal, pneumatic signal, light signal, . . . ) is thus opened, so the signal operating network automatically interrupteres the machine to a safe configuration. Such safety is said to be "active" and "positive" since it requires no computer control and it acts directly to put the system into a safe configuration, even in the event of the operating network failing.

BRIEF DESCRIPTION OF THE DRAWINGS

The interrupter elements are cheap since they are destroyed on coming into contact with the laser beam and are then replaced.

The interrupter elements are thus removable and they are provided with mechanical support members that enable them to be replaced and repositioned easily relative to the intended alignment of the laser beam.

Figure 1:
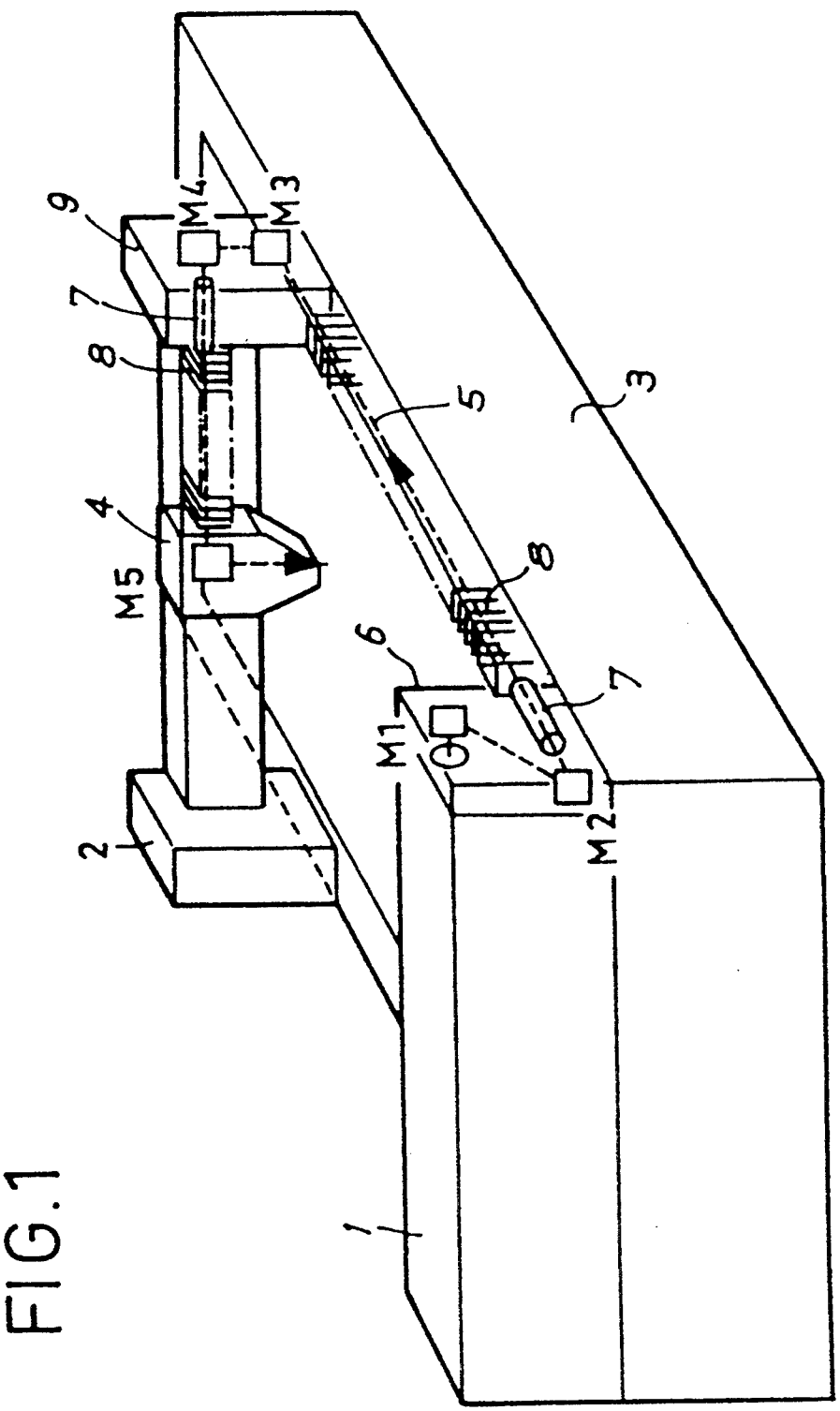
Figure 2:
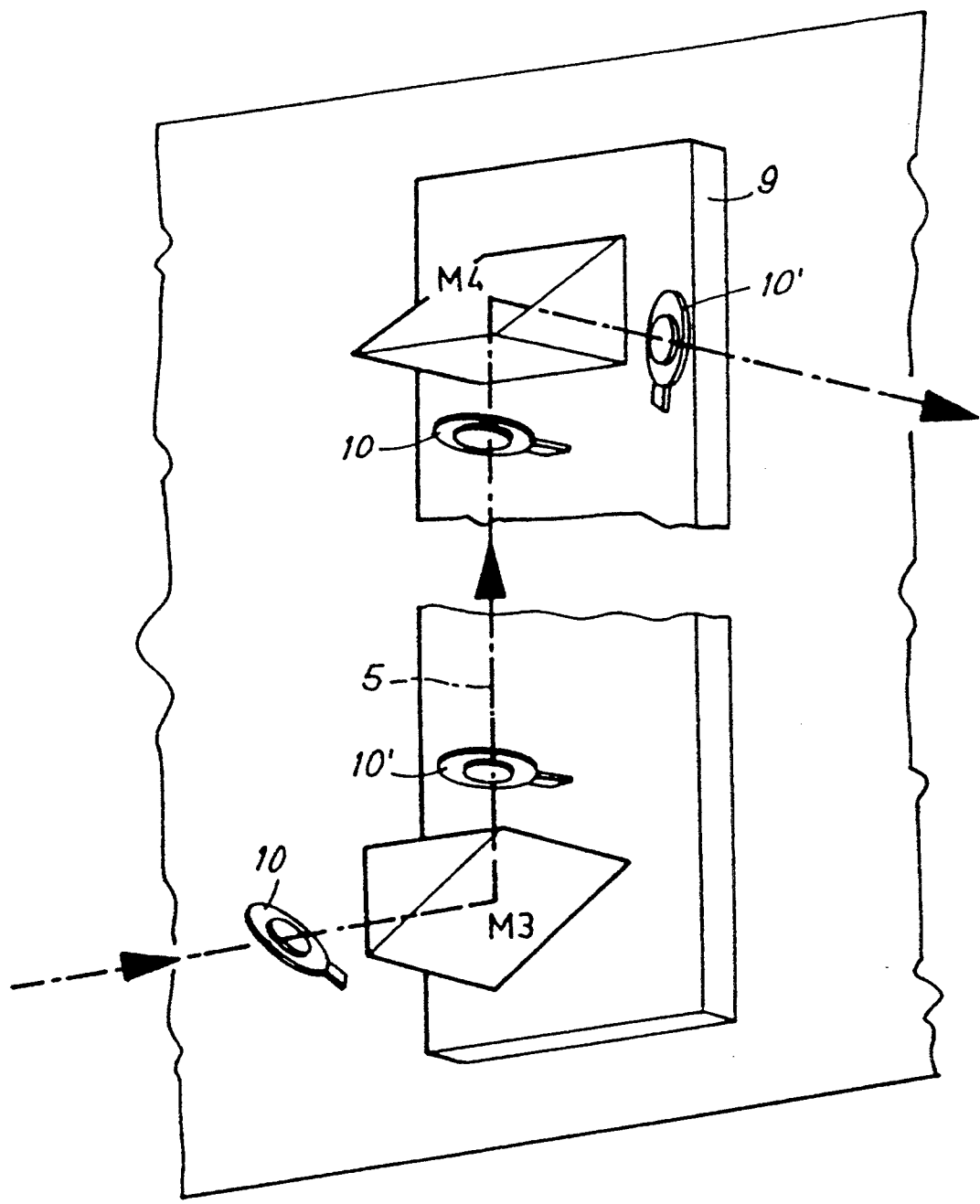
Figure 6:
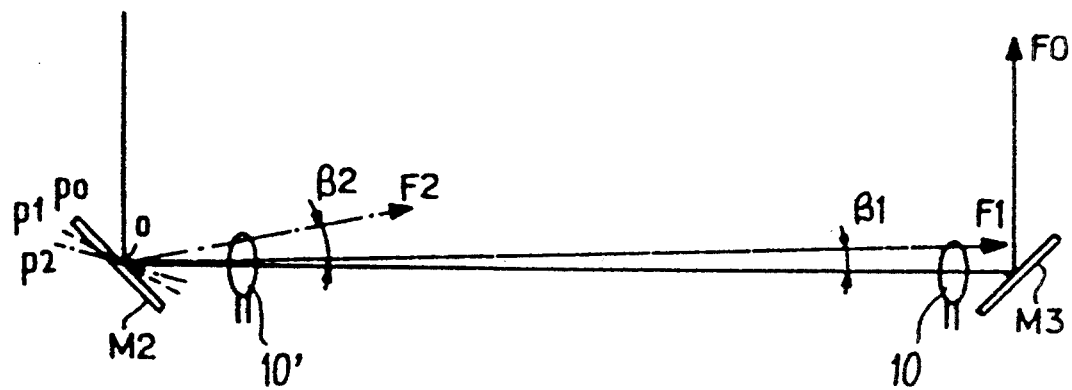

The invention will be better understood on reading the following description accompanied by the drawings, in which:

FIG. 1 is an overall view of the optical path on a machine tool that operates with XY coordinates;

FIG. 2 shows a fraction of the optical path fitted with the removable interrupter elements of the safety device of the invention;

FIG. 3 is a wiring diagram (electrical wiring, pneumatic wiring, light wiring, . . . ) for the signal operating network of the device of the invention;

FIGS. 4a to 4d show different embodiments of removable interrupter elements in the device of the invention;

FIGS. 5a and 5b show a particular embodiment of a support and connection member for such interrupter elements, seen from in front and from the side; and FIG. 6 is a diagram showing one particular implementation of the method of the invention.

MORE DETAILED DESCRIPTION OF THE DRAWINGS

FIG. 1 shows a laser cutting machine 3 that operates on the same principle as an XY plotter. It includes a laser source 1, a cross-beam, and two motor-driven carriages which together constitute a moving assembly 2 along which a cutting head 4 is movable. The laser beam 5 is conveyed from the laser source to the cutting head 4 along a path that has five mirrors (M1, M2, M3, M4, and M5). Access to the optical path and thus to the laser beam 5 is protected by installing caps 6, passive diaphragms 7 and protective bellows 8, all of which are conventional means.

FIG. 2 is an enlargement of the zone of the optical path that includes the mirrors M3 and M4 which is fixed to the support 9 situated on the moving assembly 2. In this embodiment, the interrupter elements are localized. The reference direction is the direction in which the laser beam travels, and the elements 10 are located at the inlet to the mirrors. At such positions, given the distance from the preceding mirror (M2 or M3) at which deviation of the beam, if any, may have originated, the slightest angular offset in the beam is taken into account at the inlet to the following mirror M3 or M4. Interrupter elements 10' are likewise disposed at the outlets from the mirrors so as to be able to take account of large angular deviations. A large angular variation can take place very quickly, in which case the laser would intersect the inlet element 10 of the following mirror only very fleetingly, so the signal-conducting material of that element would not necessarily have enough time to melt. After passing through the element 10, the deviation stabilizes and is taken into account by the outlet element 10' closest to the mirror at which the deviation originates.

FIG. 3 shows the monitoring signal operating network for the beam (which signal may be electrical, pneumatic, optical, . . . ). This network is directly coupled to the electrical power supply circuit of the laser source via a power contactor or relay 11. In some cases (interrupter elements having electrical conductors) it may indeed form a part thereof. All of the interrupter elements 10 and 10' in the monitoring signal operating network are connected together in series together with emergency stop buttons, or with the power contactors of the machine, and they directly control the safety contactor of the machine which is designed to stop the laser beam by closing the laser outlet or by switching off the laser source 1. As soon as any one of the interrupter elements 10 or 10' has been damaged, or any one of the emergency buttons 12 has been actuated, the safety system is activated. The machine can be put back into operation after the laser beam has been realigned and the destroyed interrupter element has been replaced. In addition, should the control signal operating network go open circuit for any reason whatsoever (bad contact, wrong connection, . . . ) safety is likewise activated. Safety is thus active and positive, thus providing reliable and effective protection for the equipment and for personnel.

FIGS. 4a to 4d show various embodiments of an interrupter element 10 or 10'. This element carries a conductor 16, 18, or 19 for the control signal which is made of a material that absorbs the energy of the laser beam 5 having an infrared wavelength (e.g.: lead, copper, tin, plastics tube, optical fiber, . . . ), such that it surrounds at least a fraction of the beam 5 without coming into contact therewith and forming a loop that lies in a plane through which the beam passes.

In another embodiment (not shown) the interrupter element is constituted entirely by a rigid signal conductor material. The conductor may alternatively be carried by a frame 17, 20, or it may be integrated within a frame. The frame is then secured to a support member 15 that serves to position and hold the frame relative to the theoretical path of the laser beam 5. In a first embodiment (FIG. 4a), the conductor is an electrical conductor and it is constituted by at least one printed circuit track 16 in the form of an open ring of diameter slightly greater than the diameter of the laser beam 5. The two ends of the track are extended in a tab 15 which is used for holding and positioning the element 10 or 10' made in this way, said tab 15 also serving to connect the track 16 to the electrical circuit of the operating network.

The embodiment of FIGS. 4b and 4c is again constituted using printed circuit technology. By splitting the fusible material into a series of concentric parallel tracks 18 of smaller section or of smaller area but witch the same overall electrical characteristics as the track 16 of the preceding embodiment, and all grouped together at each of the two ends of the track in the tab 15, the time required for the conductor material to melt is reduced, thereby improving the response time of the safety device. Another way of reducing the time required for the conductor material to melt is to increase its ability to absorb the energy conveyed by the laser beam by darkening it with surface treatment, e.g. heat treatment, paint, etc. . . . .

FIG. 4d shows yet another embodiment of the interrupter element that makes use of an optical fiber 19 to conduct light. The optical fiber 19 is held in place by a support 20. The optical fiber is connected to a transmitter/receiver 22 which converts the light signal into an electrical signal. The apparatus 22 is connected in series on the electrical circuit of the operating network or it is connected to the numerical control of the laser machine by means of wires 23. In the event of the laser beam deviating, the optical fiber 19 is cut, so the light signal is likewise cut and the transmitter/receiver 22 acts as an interrupter, i.e. it opens the electrical circuit. In this embodiment, only the assembly of the optical fiber 19 and the support 20 is replaced. The connection with the transmitter/receiver 22 is made by means of pins 21.

Similarly, and by way of example, it is possible to use a flexible pneumatic hose (not shown) instead of the optical fiber 19. Under such circumstances, an electropneumatic converter replaces the transmitter/receiver (22).

FIGS. 5a and 5b show an embodiment of the support member for the interrupter element 10 or 10' in FIGS. 4a to 4c. The element 10 or 10' is installed by fitted engagement of the tab 15 of the conductor (printed circuit) in a support slot 13 fixed on the machine. It is held in place by the tab 15 of the element 10 or 10' being clamped in the slot which is provided with electrical contacts 14 that are connected to the ends of the tracks 16 or 18.

FIG. 6 is a diagram showing an implementation of the method of the invention.

The position p0 of the mirror M2 corresponds to the normal path F0 of the beam. If the orientation of the mirror M2 is changed. (position p1), the corresponding small change in angle $\beta 1$ is taken into account by the interrupter element 10 situated at the inlet of the mirror M3. This disposition is useful since the small amplitude of the variation does not cause the laser beam F1 to destroy the conductor of the interrupter element 10' positioned at the outlet of the mirror M2. In contrast, given the distance of the element 10 from the point of origin O of the angular deviation $\beta 1$, the laser beam interacts with said interrupter element of the safety device. Consequently, the further the element 10 situated at the inlet of one mirror is from the preceding mirror constituting the origin of the deviation, the greater the sensitivity of the device to small variations.

If the mirror M2 moves quickly from its normal position p0 to a position p2, then the deviation $\beta 2$ of the laser beam is not necessarily taken into account by the element 10. The duration of the interaction between the beam F2 and the conductor of the element 10 may be too short so that the conductor is not completely destroyed. A deviation of this type can be detected more reliably by the interrupter element 10'. The closer the interrupter element 10' is situated to the outlet from a mirror at which the angular deviation originates, the larger the angular variations that it can detect.

We claim:

1. A safety device for use in an operating network for a laser beam monitoring signal which network monitors whether a laser beam is following a determined optical path, said safety device including at least one removable signal interrupter element constituted at least in part by a conductor for said monitoring signal, said conductor surrounding the beam following the determined optical path when said signal interrupter element is disposed along the optical path, said conductor being formed of a material that interacts with the beam in the event of the beam deviating from the determined path and into contact with the conductor, with the interaction causing the monitoring signal to be interrupted so as to result in beam interruption, and said conductor being constituted by at least one printed circuit that is coupled to an electrical circuit of the operating network, and said conductor also being constituted by a series of concentric tracks.

2. A device according to claim 1, characterized in that said signal conductor includes a frame (17) which, when disposed on the optical path, extends transversely to the determined optical path, said frame being secured to a support member (15) provided with means (14, 21) for connecting said conductor to the operating network.

3. A device according to claim 1, wherein said interrupter element is annular and said conductor forms a loop around the beam (5).

4. A device according to claim 1, wherein said signal conductor is suitable for being destroyed by energy generated by the beam (5).

5. A device according to claim 1, wherein said device includes a plurality of interrupter elements and the interrupter elements (10, 10') are connected in series on the operating network which network is connected to an electrical power supply circuit of a laser source (1).

6. A device according to claim 1, wherein said conductor is made of a material that absorbs the energy of the beam (5).

7. A device according to claim 1, wherein said device includes a plurality of interrupter elements spaced along the optical path and placed in series with a plurality of beam deflection mirrors also positioned along the optical path, and said interrupter elements (10, 10') are placed at an inlet and an outlet of at least one of the mirrors (M1–M5).

8. A method of detecting deviations ($\beta 1$, $\beta 2$) of a laser beam (5, F1, F2) emitted by a source (1) and following a given optical path that includes mirrors (M1–M5), the source being associated with an operating network for a beam monitoring signal, the method being characterized in that removable interrupter elements (10, 10') of the signal are inserted in the operating network along the optical path and around the beam, each interrupter element being constituted, at least in part, by a conductor of said signal that interacts with the beam when the beam deviates from the given optical path and comes in contact with a conductor so as to cause the monitoring signal to be interrupted and thus cause the beam to be interrupted, and each conductor being constituted by at least one printed circuit that is coupled to an electrical circuit of the operating network and said conductor also being constituted by a series of concentric tracks.

* * * * *

UNITED STATES PATENT AND TRADEMARK OFFICE
CERTIFICATE OF CORRECTION

PATENT NO. : 5,442,154
DATED : August 15, 1995
INVENTOR(S) : Michel Philippe et al.

It is certified that error appears in the above-identified patent and that said Letters Patent is hereby corrected as shown below:

In the left hand column of the cover page of the patent, please change "PCT Filed: Apr. 30, 1992" to --PCT Filed: Apr. 30, 1993--

Signed and Sealed this

Twenty-sixth Day of December, 1995

Attest:

BRUCE LEHMAN

Attesting Officer     Commissioner of Patents and Trademarks